United States Patent [19]

Kurita et al.

[11] Patent Number: 5,664,653

[45] Date of Patent: Sep. 9, 1997

[54] ROTARY UNIT HAVING CLUTCH FUNCTION

[75] Inventors: Masahiro Kurita; Kenichi Ichikawa; Masakazu Doumoto, all of Kuwana, Japan

[73] Assignee: NTN Corporation, Osaka, Japan

[21] Appl. No.: 571,488

[22] Filed: Dec. 13, 1995

[30] Foreign Application Priority Data

| Dec. 14, 1994 | [JP] | Japan | 6-310659 |
| Mar. 30, 1995 | [JP] | Japan | 7-073350 |
| Jul. 27, 1995 | [JP] | Japan | 7-192053 |

[51] Int. Cl.$^6$ .................... F16D 15/00; F16D 41/06
[52] U.S. Cl. .................... 192/45.1; 192/41 A; 188/82.1
[58] Field of Search .................... 192/45.1, 41 A; 188/82.1, 82.8; 384/555, 560, 569, 571, 585

[56] References Cited

U.S. PATENT DOCUMENTS

| 2,113,722 | 4/1938  | Dodge        | 192/45.1 |
| 2,268,376 | 12/1941 | Dodge        | 192/45.1 |
| 2,307,881 | 1/1943  | Dodge        | 192/45   |
| 2,342,227 | 2/1944  | Swenson      | 192/45.1 |
| 2,365,062 | 12/1944 | Dodge        | 192/45.1 |
| 2,407,772 | 9/1946  | Dodge        | 192/45.1 |
| 2,408,962 | 10/1946 | Swenson et al. | 192/45.1 |
| 2,412,803 | 12/1946 | Dodge        | 192/45.1 |
| 2,423,178 | 7/1947  | Dodge        | 192/45.1 |
| 3,006,447 | 10/1961 | Irwin        | 192/45.1 |
| 3,022,875 | 2/1962  | Davis        | 192/45.1 |
| 3,443,672 | 5/1969  | Giese        | 192/45.1 |

*Primary Examiner*—Andrea L. Pitts
*Attorney, Agent, or Firm*—Wenderoth, Lind & Ponack

[57] ABSTRACT

A rotary unit with a built-in clutch which is short in its axial length. The rotary unit has an inner member having an outer periphery formed with a raceway groove and a pair of cylindrical surfaces on both sides of the raceway groove, and a cylindrical outer member having an inner periphery formed with a raceway groove and a pair of cylindrical surfaces on both sides of the groove. A retainer mounted between the inner and outer members has a plurality of circumferentially spaced pockets each housing a rolling member and sprag housing recesses provided alternately with the pockets. In each recess is received a sprag having both ends thereof resting on the opposing cylindrical surfaces and biased by a resilient member so that its inner and outer arcuate surfaces contact the cylindrical surfaces. By arranging the sprags and the rolling members alternately with each other in the circumferential direction, it is possible to reduce the entire axial length of the rotary unit.

10 Claims, 8 Drawing Sheets

ROTARY UNIT HAVING CLUTCH FUNCTION

BACKGROUND OF THE INVENTION

This invention relates to a rotary unit, such as a bearing or a pulley unit, having a clutch function.

A full-automatic washing machine-has a motor-driven main rotary shaft, a first output shaft coupled to and driven by the main rotary shaft, and a pulsator mounted on and rotated by the first output shaft. It may further include a second tubular output shaft provided around the first output shaft and driven by the main rotary shaft to drive a washing tub mounted on the second shaft together with the pulsator.

Ordinarily, the second output shaft of such a full-automatic washing machine is rotatably supported by a bearing mounted on the housing. Thus, the second output shaft may be rotated together with the rotating first output shaft. Some full-automatic washing machines are provided with a one-way clutch and a band brake to prevent the second output shaft from rotating together with the first output shaft.

Such a one-way clutch has to be mounted in close proximity to the bearing supporting the second output shaft. Thus, if they are designed to be assembled separately, such assembly work tends to be troublesome and time-consuming.

Figure 13:
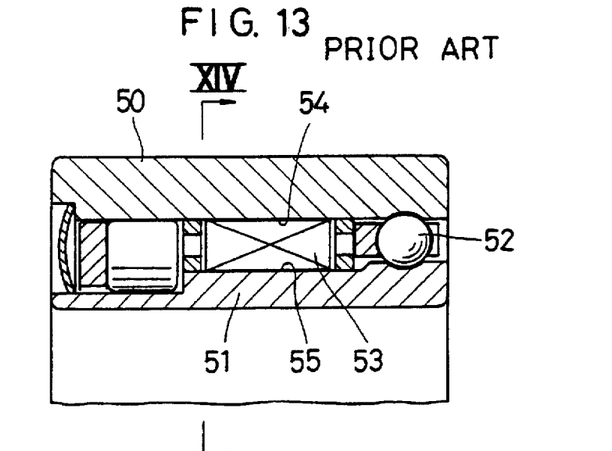
FIG. 13 is a sectional view of a conventional bearing with a built-in clutch.
Figure 14:
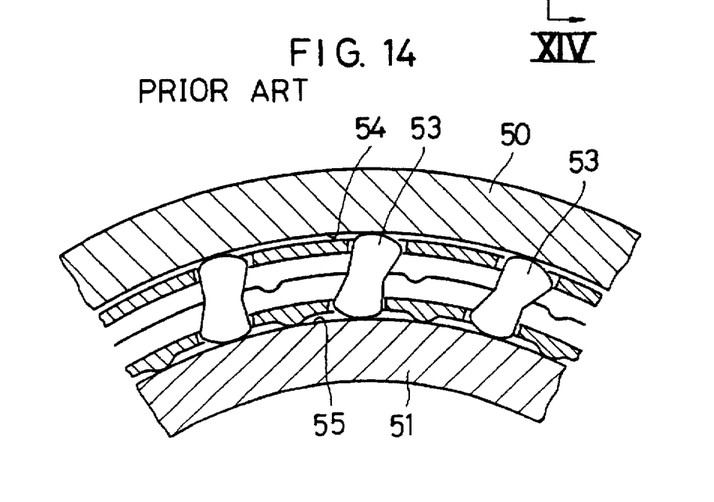
FIG. 14 is a sectional view taken along line XIV—XIV of FIG. 13.

Unexamined Japanese Patent Publication 54-109557 proposes a solution to this problem. It discloses a bearing with a built-in clutch comprising, as shown in FIGS. 13 and 14, an outer ring 50, an inner ring 51, balls 52 and sprags 53 disposed between the outer and inner rings 50 and 51, and means for moving the sprags 53 into and out of engagement with cylindrical surfaces 54 and 55 of the outer and inner rings 50 and 51.

Unexamined Japanese Patent Publication 61-228153 discloses a belt transmission for transmitting the rotation of a crankshaft of an automobile to a rotary shaft of an engine auxiliary such as an alternator, which is large in inertia and thus tends to rotate at a substantially constant speed.

This belt transmission includes a one-way clutch mounted between the rotary shaft of the engine auxiliary and a pulley supported on the rotary shaft. It transmits the rotation of the crankshaft to the rotary shaft while the angular velocity of the crankshaft, which is changing minutely during one rotation, is increasing, and cuts off transmission while the angular velocity is decreasing.

Namely, while the angular velocity of the crankshaft is increasing, the one-way clutch engages, coupling the rotary shaft of the engine auxiliary to the pulley, so that the rotation of the crankshaft is transmitted to the rotary shaft. When the rotary shaft begins to rotate faster than the pulley, the one-way clutch will disengage, letting the rotary shaft rotate freely.

This belt transmission can prolong the life of the belt and reduce the belt slipping sounds by preventing slipping between the pulley and the belt.

But if such a one-way clutch is mounted directly between the rotary shaft and the pulley, radial and moment loads that act on the pulley will be applied directly to the clutch, making high-precision operation of the clutch impossible. Also, the life of the clutch will be shortened.

This problem is solved by supporting the pulley by a bearing. But it is troublesome and time-consuming to assemble and mount the one-way clutch and the bearing separately from each other.

The bearing/clutch assembly shown in FIGS. 13 and 14 can be modified into an easy-to-assemble pulley unit with a clutch function by replacing its bearing outer ring 50 with a pulley.

But the clutch/bearing assembly shown in FIGS. 13 and 14, or the pulley unit with a clutch function as modified in the abovesaid manner, has a problem in that its axial length is rather large because its balls 52 and sprags 53 are arranged axially in series.

SUMMARY OF THE INVENTION

An object of this invention is to provide a rotary unit such a bearing or a pulley unit with a built-in clutch which is short in its axial length.

According to this invention, there is provided a rotary unit having a clutch function comprising an inner member to be fixed to a shaft and having an outer periphery formed with a first raceway groove and a pair of first cylindrical surfaces arranged on both sides of the first raceway groove. A cylindrical outer member is mounted around the inner member and has an inner periphery formed with a second raceway groove and a pair of second cylindrical groove. A plurality of rolling members are mounted between the first and second raceway grooves. A plurality of sprags arranged between the adjacent ones of the rolling members and each having a length such that both ends thereof will rest on the first and second cylindrical surfaces on both sides of the raceway grooves. Each sprag has inner and outer arcuate surfaces. A retainer is mounted between the inner member and the outer member is and formed with pockets for housing the rolling members and sprag housing recesses for housing the sprags. A resilient means for urging the sprags in such a way that the inner and outer arcuate surfaces engage the cylindrical surfaces of the inner member and outer member, respectively.

The resilient means may be a spring ring mounted on one end of the retainer having as many spring pieces as the sprags. The spring pieces are portions of the spring ring defined by cuts and raised to be inserted into the respective sprag housing recesses through windows formed in the one end of the retainer.

Instead of the above mentioned sprags, engaging type sprags maybe used in which they engage at their inner and outer arcuate surface, the cylindrical surfaces of the inner member and outer member, respectively, when erected under centrifugal force. With this arrangement, it is possible to omit the resilient means.

This rotary unit can be used as a bearing having a clutch function by using a bearing outer race as the outer member, or as a pulley unit with a clutch function by using a pulley as the outer member.

The pulley unit with a clutch function should be supported so that the pulley will scarcely incline relative to the inner member so as to guide the belt as stably as possible. For this purpose, the rolling members may be mounted between the inner and outer raceway grooves so that negative radial gaps are formed between the rolling members and the inner and outer raceway grooves. Otherwise, angular-contact type grooves may be employed as the inner and outer raceway grooves so that each rolling member contacts the grooves at four points.

Therefore, the rotary unit according to this invention is significantly shorter in axial length than conventional rotary members of the same type.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Embodiments of this invention are described with reference to FIGS. 1–12.

FIGS. 1–4 show a bearing with a built-in clutch of this invention. It comprises an inner race 1 to be mounted on a shaft, an outer race 2 mounted around the inner race 1, and a retainer 3 mounted between the two races 1 and 2.

Figure 1:
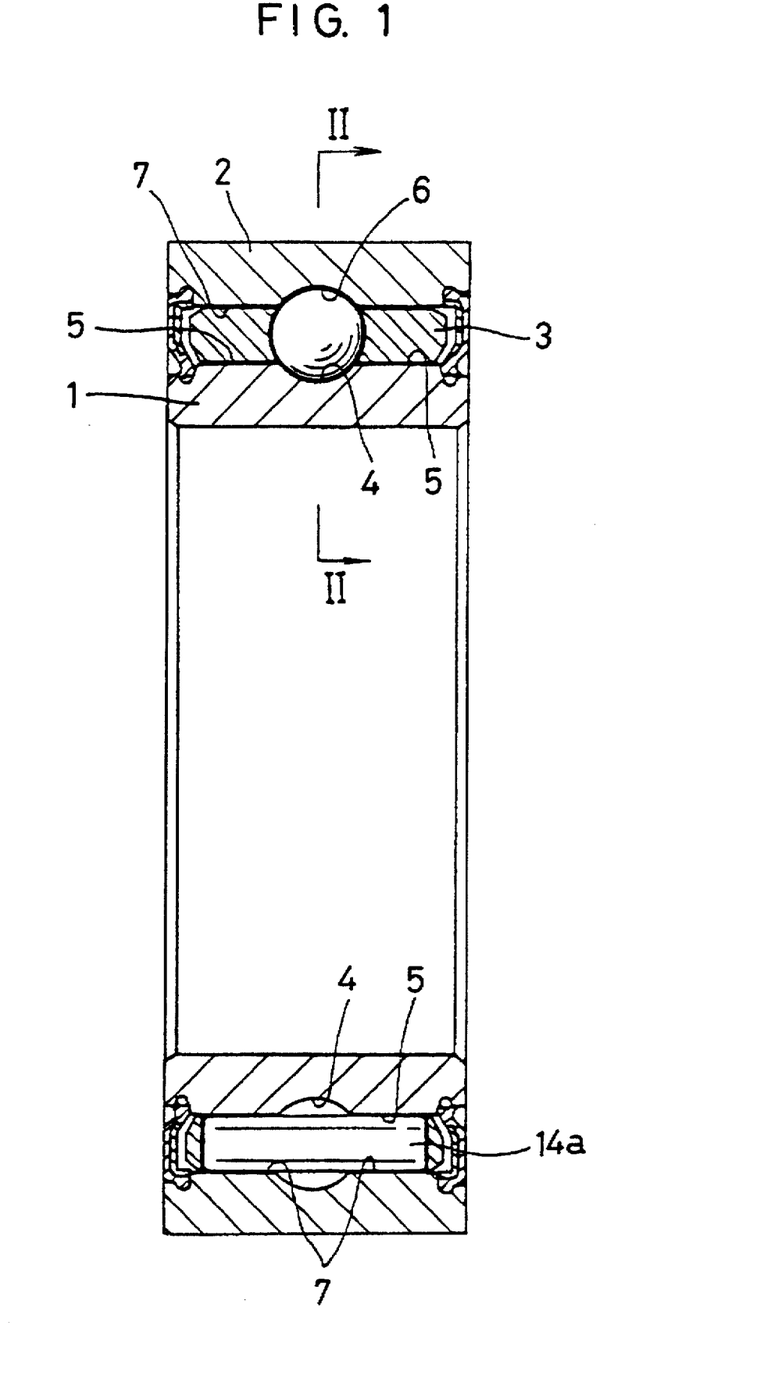
FIG. 1 is a sectional view of a first embodiment of the rotary unit with a built-in clutch according to this invention.

On the outer periphery of the inner race 1, an axially central raceway groove 4 and cylindrical surfaces 5 on both sides of the groove 4 are formed.

The inner periphery of the outer race 2 is made up of an axially central groove 6 and cylindrical surfaces 7 on both sides of the groove 6.

Figure 4:
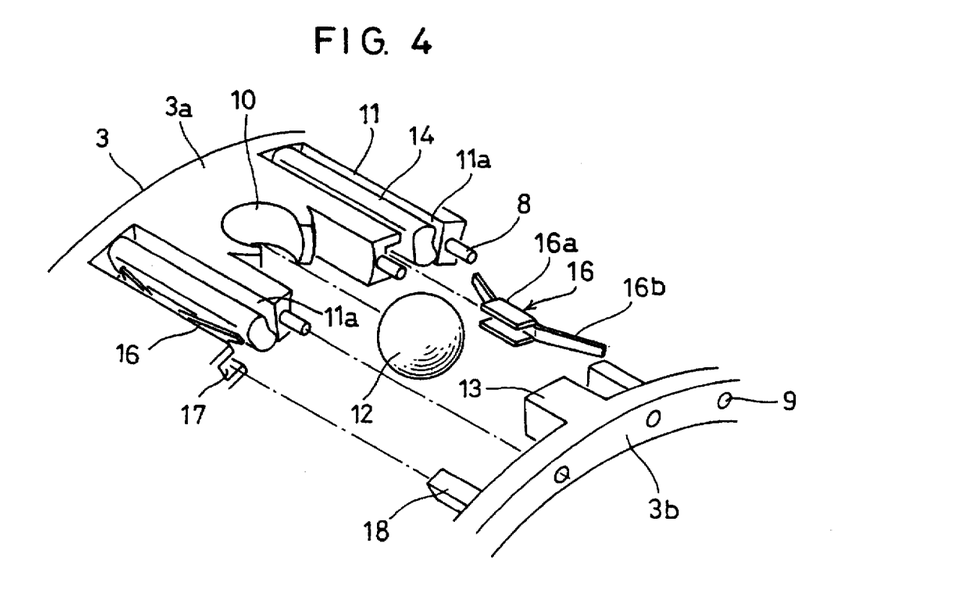
FIG. 4 is an exploded perspective view of a retainer of the first embodiment.

The retainer 3 comprises a cylindrical cage body 3a and a ring-shaped cover 3b. A plurality of pins 8 are formed on an axial end of the retainer body 3a. The cover 3b has pin holes 9 for receiving the pins 8. The retainer body 3a and the cover 3b are integrally joined together by melting the pins 8 inserted in the holes 9.

Figure 11:
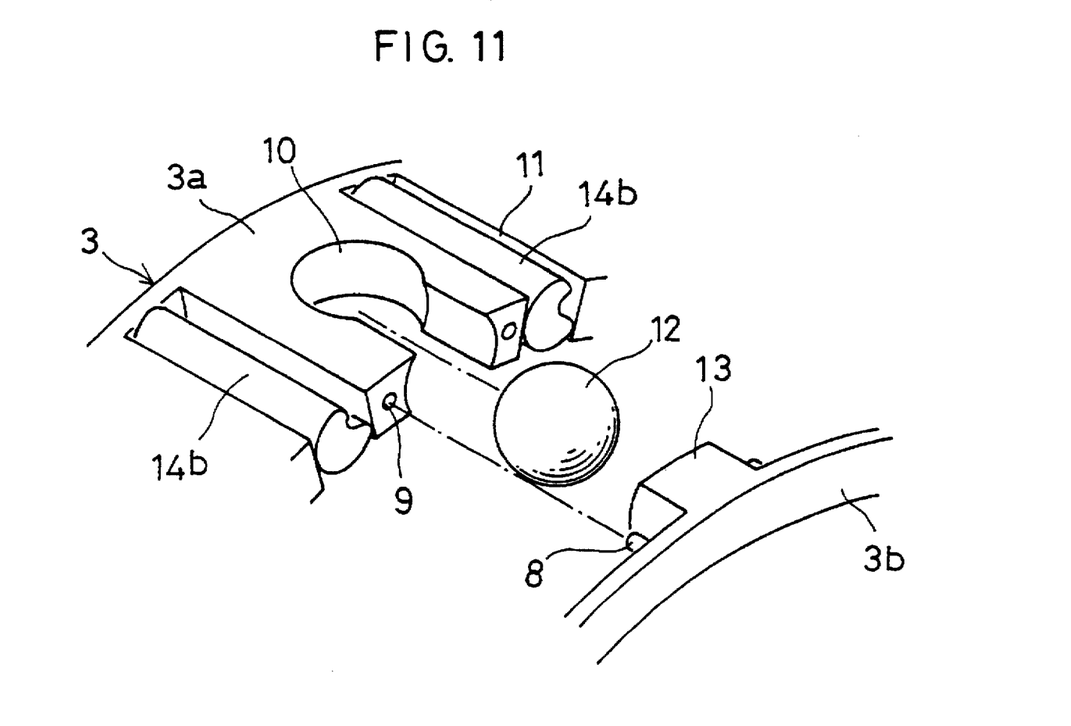
FIG. 11 is an exploded perspective view of its retainer.

Instead, as shown in FIG. 11, pin holes 9 and pins 8 to be press-fitted in the holes 9 may be formed in and on the retainer body 3a and the cover 3b, respectively. Also, instead of forming pins, the retainer body 3a and the cover 3b may be joined together by melting their abutting ends.

The retainer body 3a has pockets 10 and sprag housing recesses 11 arranged circumferentially alternating with each other, opening at one axial end of the retainer body 3a. A rolling member 12 is received in each pocket 10.

The rolling members 12 can roll along the raceway grooves 4 and 6 formed in the inner and outer races 1 and 2. The cover 3b has protrusions 13 to prevent the rolling members 12 from coming out of the pockets 10 through their open ends.

The rolling members 12 may be rollers, though balls are used in the embodiment.

Figure 2:
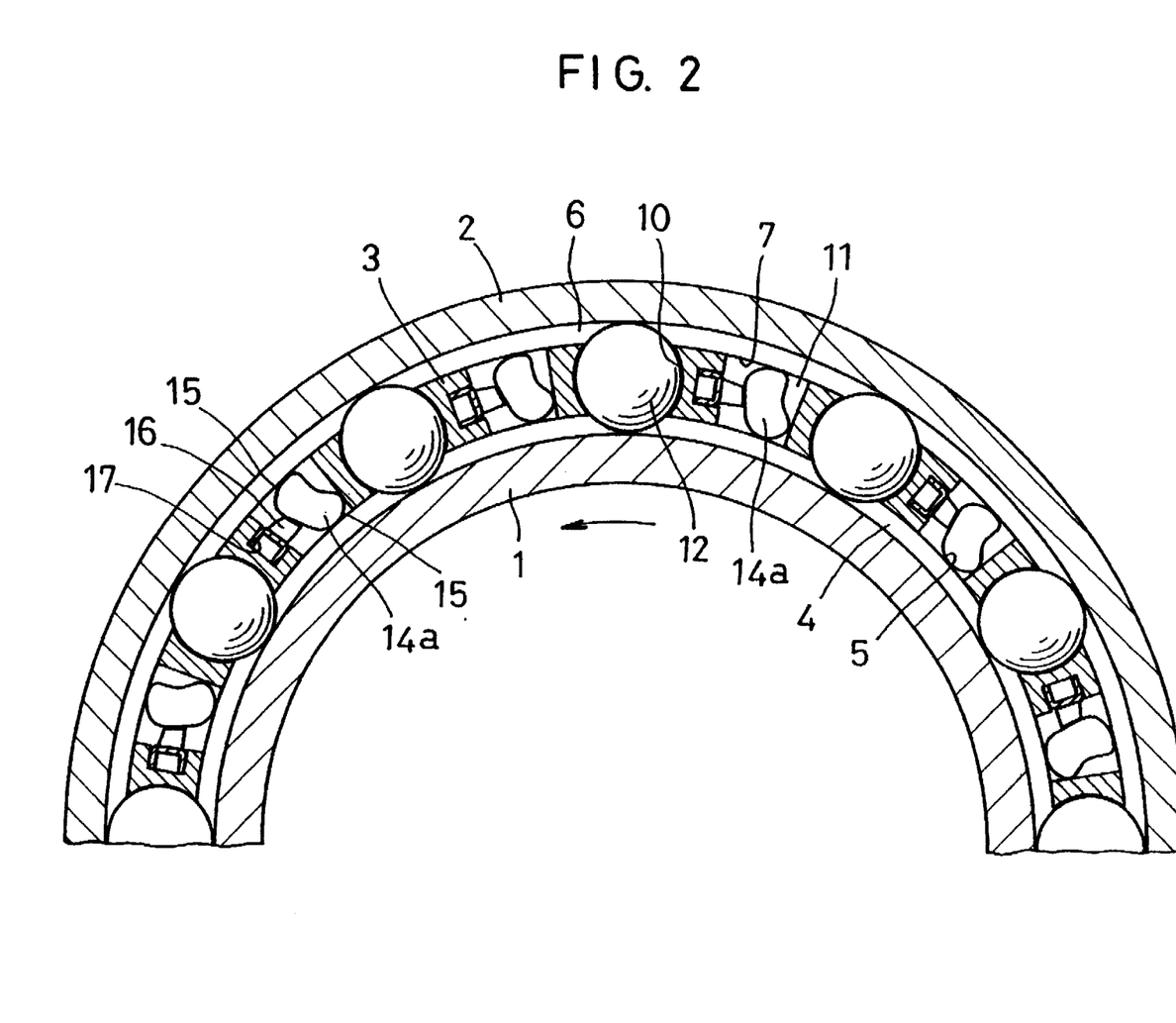
FIG. 2 is a sectional view taken along line II—II of FIG. 1.

A sprag 14a is received in each sprag housing recess 11. It has a length such that its ends rest on the cylindrical surfaces 5 and 7 on both sides of the raceway grooves 4 and 6, and has at inner and outer ends arcuate surfaces 15 which engage the cylindrical surfaces 5 on the inner race 1 and the cylindrical surfaces 7 of the outer race 2, respectively (FIG. 2).

The sprags 14a may be an engaging type or a disengaging type.

Each sprag 14a abuts a wall 11a, i.e. one of the circumferentially opposite walls 11a and 11b of the spring housing recess 11, and is biased by a resilient member 16 disposed between the sprag and the other circumferentially opposite wall 11b so that its inner and outer arcuate surfaces 15 abut the cylindrical surfaces 5 and 7 of the inner race 1 and the outer race 2, respectively.

The resilient members 16 used in the embodiment are metal plates each comprising a body 16a having a pair of resilient fingers 16b formed at both ends of the body 16a. They may also be coil springs or rubber members, or may be resilient resin members integrally formed on the retainer body 3a or the cover 3b.

Figure 3:
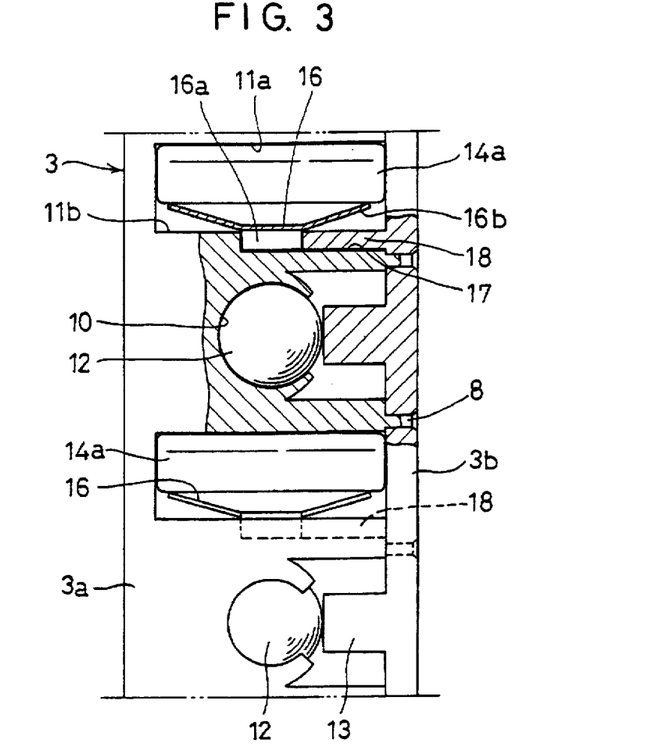
FIG. 3 is a partially cutaway plan view of FIG. 2.

The body 16a of each resilient member 16 is inserted in a groove 17 formed in the other opposite wall 11b of each sprag housing recess 11. In this state, the resilient members 16 are prevented from moving axially by second protrusions 18 formed on the cover 3b (FIG. 3).

When the inner race 1 is rotated in the direction of arrow shown in FIG. 2, the sprags 14a, having their inner arcuate surface 15 in contact with the cylindrical surfaces 5 of the inner race 1, are biased to turn clockwise in FIG. 2, so that their inner and outer arcuate surfaces 15 engage the cylindrical surfaces 5 and 7 of the inner and outer races 1 and 2, respectively.

Thus, if the outer race 2 is fixed to the housing, the inner race 1 is prevented from turning counter clockwise. If the outer race 2 is rotatably supported, the rotation of the inner race 1 can be transmitted through the sprags 14a to the outer race 2.

When the inner race 1 is rotated in the direction opposite to the arrow in FIG. 2, i.e. clockwise, the sprags 14 will incline counterclockwise while resiliently deforming the resilient members 16, so that their inner arcuate surfaces will slip on the cylindrical surfaces 5 of the inner race 1. The inner race is thus allowed to freely rotate.

This bearing/clutch assembly may be used as a bearing for a second output shaft supporting the washing tub of a full-automatic washing machine.

This bearing/clutch assembly is significantly short in axial length compared with conventional bearing/clutch assemblies. This is because the sprags 14a, having a length such that their ends rest on the cylindrical surfaces 5 and 7 on both sides of the raceway grooves 4 and 6 of the inner and outer races 1 and 2, are provided between the adjacent rolling members 12, which roll along the raceway grooves 4 and 6, instead of arranging the rolling members and the sprags in series in the axial direction as with the conventional bearing/clutch assemblies.

Further, with this arrangement, the rolling members 12 bear radial loads that act on the inner race 1 and the outer race 2, so that the sprags 14a are practically free from such radial loads. The sprags can thus perform the clutch function with high accuracy. By using rollers as the rolling members 12, it is possible to bear a fairly large radial load.

Figure 5:
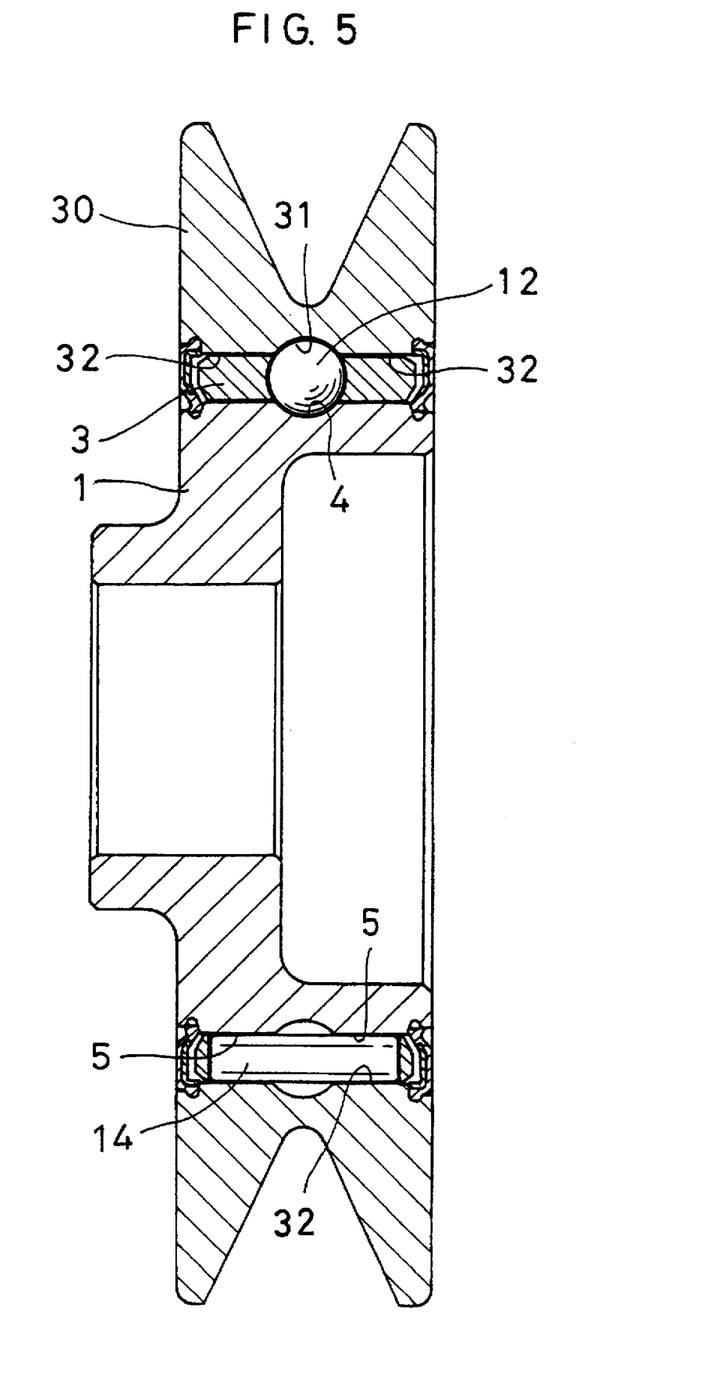
FIG. 5 is a sectional view of a second embodiment of the rotary unit with a built-in clutch.

FIG. 5 shows a second embodiment of this invention. In this embodiment, instead of the outer race 2 used in the first embodiment, a belt guide pulley 30 is used. It has on its inner periphery a raceway groove 31 and cylindrical surfaces 32 on both sides of the groove 31.

Figure 6:
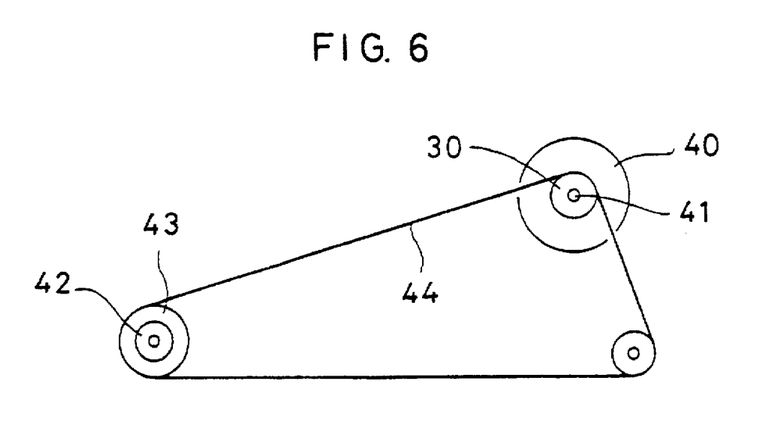
FIG. 6 is a schematic view of the same showing how it is used.

The clutch/pulley assembly shown in FIG. 5 is used e.g. as shown in FIG. 6. In this arrangement, the inner race 1 is fixedly mounted on a rotary shaft 41 of an alternator 40, which is large in inertia and thus tends to rotate at a substantially constant speed. The pulley 30, mounted around the inner race 1, is coupled to a pulley 43 mounted on a crankshaft 42 by means of a belt 44.

While the crankshaft 42 is being rotated, its angular velocity tends to fluctuate within a narrow range. Suppose now the pulley 30, which corresponds to the outer race 2 in FIG. 2, is rotated clockwise in FIG. 2 by the crankshaft 42. While the angular velocity of the crankshaft is increasing, the sprags 14a come into engagement with the cylindrical surfaces 5 and 32 of the inner race 1 and the pulley 30, thus transmitting the rotation of the crankshaft 42 to the rotary shaft 41 of the alternator 40.

When the angular velocity of the crankshaft 42 begins to drop, its rotating speed will become lower than that of the rotary shaft 41 of the alternator 40. Thus, the sprags 14a slip on the cylindrical surfaces 5 and 32. Now the rotation of the pulley 30 is not transmitted to the rotary shaft 41 any more. Thus the rotary shaft will rotate freely, so that no slip will occur between the pulley 30 and the belt 44. This makes it possible to reduce wear of the belt 44 and its slipping noise.

When using the pulley/clutch assembly shown in FIG. 5 in the manner as shown in FIG. 6, if there exists a positive radial gap between each rolling member 12, which is in the form of a ball, and the raceway grooves 4 and 31, the pulley 30 is liable to move in the axial direction because the axial gap is several to several tens of times greater than the radial gap. If the pulley 30 moves axially, it also tends to get inclined relative to the inner race 1. This makes it difficult to stably guide the belt 44.

Figure 7A:
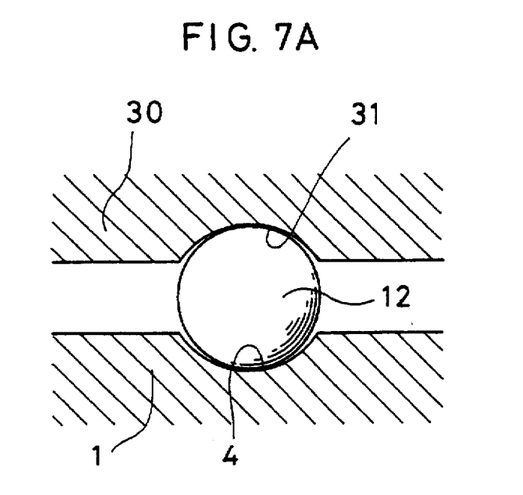
FIGS. 7A and 7B are sectional views of different raceway grooves for guiding the rolling members.

Thus, in the arrangement shown in FIG. 7A, a negative radial gap is formed between each ball 12 and the inner and outer raceway grooves 4 and 31. By forming such a negative radial gap, it is possible to reduce the axial gap between each ball 12 and the raceway grooves 4 and 31. The pulley 30 is thus less likely to be inclined relative to the inner race 1, so that the belt 44 can be guided stably.

Figure 7B:
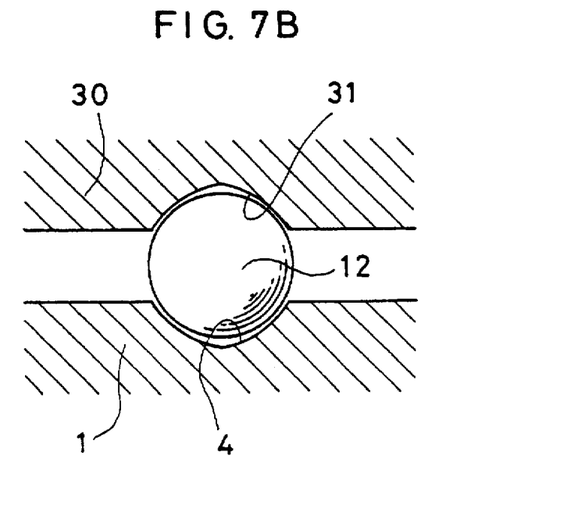

In the arrangement of FIG. 7B, the inner and outer raceway grooves 4 and 31 are angular contact type grooves adapted to come into contact with each rolling member 12 each at two points, four in total. The axial gap between each ball and such angular contact type raceway grooves 4 and 31 is even smaller than the axial gap in the arrangement of FIG. 7A. Thus, it is possible to further reduce the axial movement of the pulley 30 and increase the rigidity against inclination relative to the inner race 1.

Another advantage of this arrangement is that the contact angle between the balls and the raceway grooves 4 and 31 is relatively large. The larger the contact angle, the higher the thrust load bearing capacity of the assembly.

Figure 8:
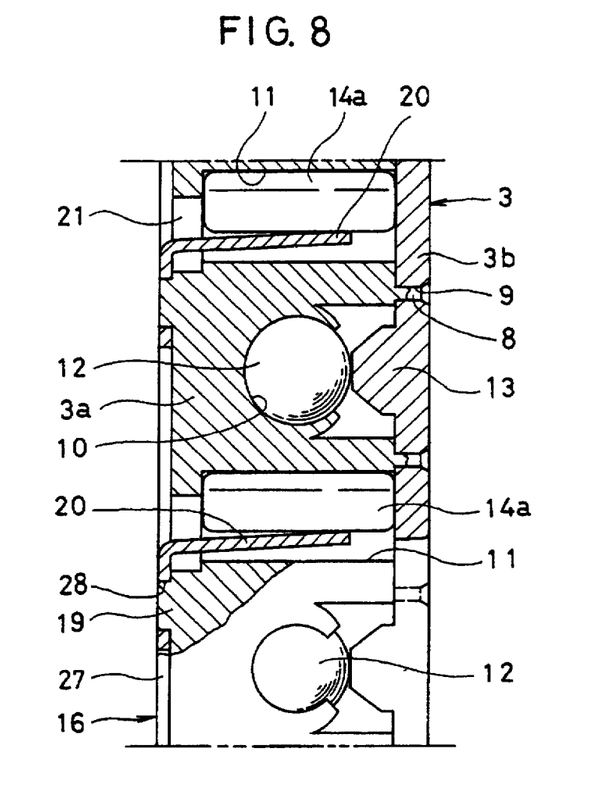
FIG. 8 is a partially cutaway front view of the retainer and resilient members of a different type.
Figure 9:
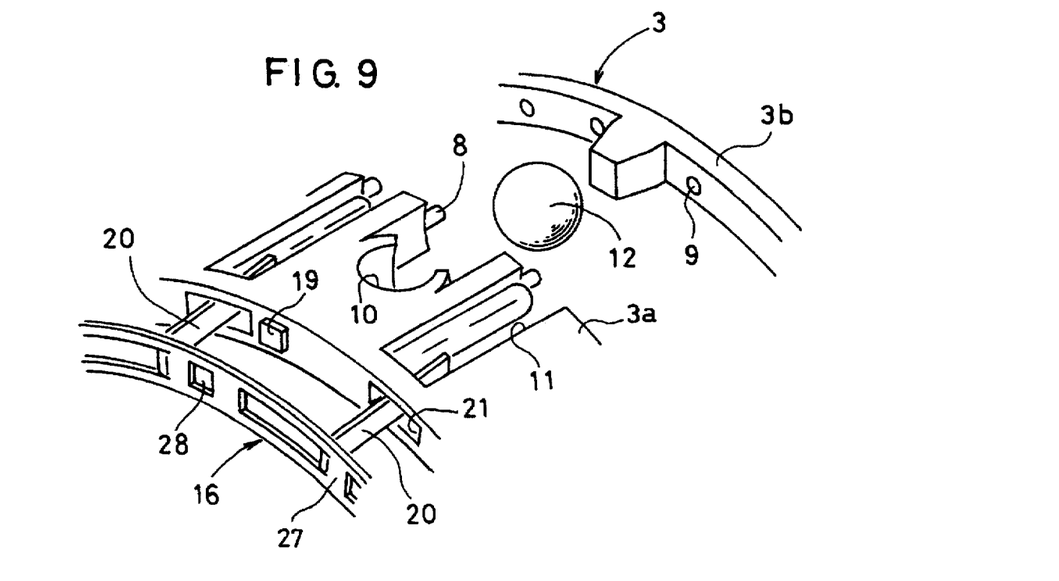
FIG. 9 is an exploded perspective view of FIG. 8.

FIGS. 8 and 9 show a modified retainer 3 and resilient member 16. The retainer 3 comprises a cage body 3a and a ring-shaped cover 3b mounted on one end of the retainer body 3a.

The cover 3b is connected to the retainer body 3a in the same manner as in the embodiment shown in FIG. 3. Thus, like elements are denoted by like numerals and their description is omitted.

The retainer body 3a has pockets 10 and sprag housing recesses 11 arranged circumferentially alternating with each other and opening at one axial end of the retainer body 3a. Protrusions 13 formed on the cover 3b prevent the rolling members 12 received in the pockets 10 from coming out of the pockets 10. A sprag 14a is mounted in each sprag housing recess 11.

The resilient member 16 is a spring ring 27 having a plurality of holes 28. Protrusions 19 are formed on the other axial end of the retainer body 3a.

The spring ring 27 is secured to the other axial end of the retainer body 3a by press-fitting the protrusions 19 into the holes 28 and optionally melting the tips of the protrusions 19.

The spring ring 27 has as many spring fingers 20 as the sprags 14a. They are formed by cutting the ring 27 and raising the portions defined by the cuts. They are inserted into the sprag housing recesses 11 through windows 21 formed in the other axial end of the retainer body 3a to bias the sprags 14a in the circumferential direction of the retainer 3.

By using the spring ring 27 having a plurality of spring fingers 20 as the resilient member 16, it is possible to reduce the number of parts and simplify the assembling work compared with the arrangement in which a plurality of separate resilient members are mounted one by one in the sprag housing recesses 11. The manufacturing cost is thus low.

Figure 10:
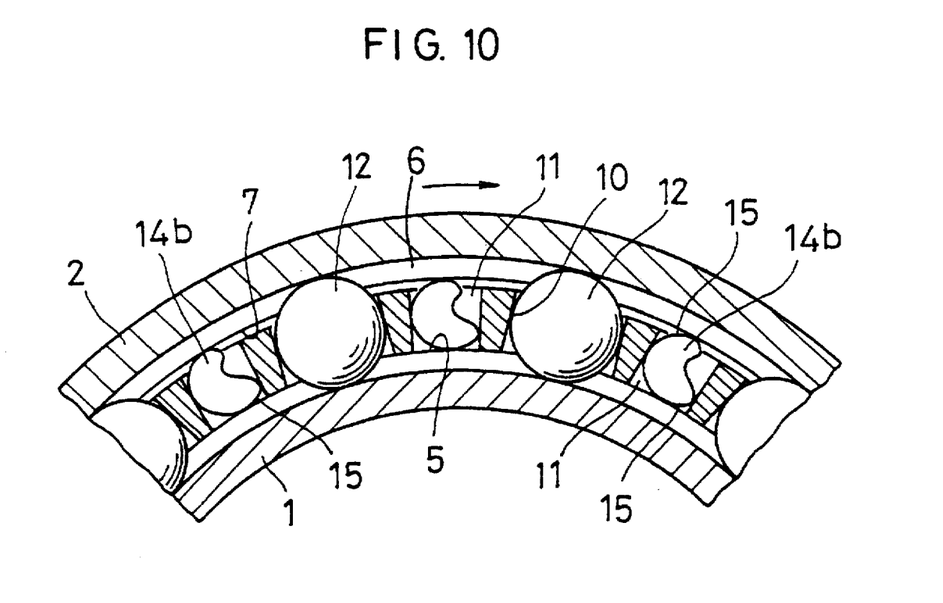
FIG. 10 is a sectional view of a third embodiment of the rotary unit with a built-in clutch.
Figure 12:
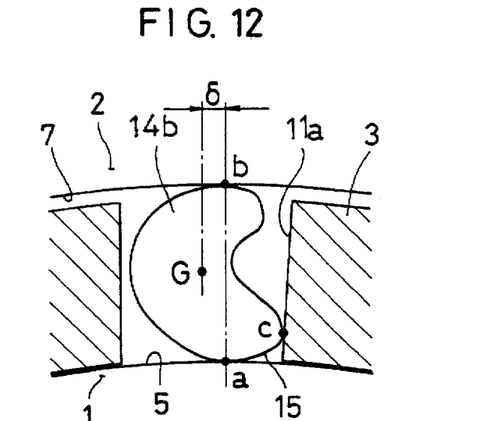
FIG. 12 is a front view of its sprag.

FIGS. 10 to 12 show a third embodiment of this invention. In this embodiment, instead of the disengaging type sprags 14a used in the first embodiment, engaging type sprags 14b are used. Otherwise, this embodiment is substantially the same as the first embodiment except that the retainer 3 has a slightly different shape and that the resilient members are not provided. Like elements are denoted by like numerals and their description is omitted.

FIG. 12 shows an engaging type sprag 14b. Its center of gravity G is circumferentially apart by distance δ from the line connecting the contact points a and b between the inner and outer arcuate surfaces 15 of the sprag 14b and the inner and outer races 1 and 2. Thus, it is adapted to be erected under centrifugal force.

In the third embodiment, when the outer race 2 is rotated in the direction of arrow in FIG. 10, the rolling members 12 roll in contact with the raceway groove 6 of the outer race 2, so that the retainer 3 is rotated in the same direction as the outer race 2 at a slower speed than the outer race 2.

The sprags 14b are rotated about the axis of the retainer at the same speed as the retainer. But since they are in contact at point b with the outer race 2, which is rotating at a higher speed than the retainer, they are erected by being pulled by the outer race 2 at point b.

Also, since they are engaging type sprags, they will be automatically erected under centrifugal force until they engage the outer race 2 and the inner race 1 at contact points b and a. The rotation of the outer race 2 is thus transmitted to the inner race 1.

When the inner race 1 begins to rotate faster than the outer race 2, the sprags 14b are inclined, disengaging from the races 1 and 2. Now, the rotation of the outer race 2 is not transmitted to the inner race 1.

If the outer race 2 is rotated in the direction opposite to the direction indicated by arrow in FIG. 10, the sprags 14 will be urged by the rotating retainer 3 so that their inner and outer arcuate surfaces 15 are kept in contact with the cylindrical surfaces 5 and 7 of the inner and outer races 1 and 2, respectively. But in this state, the sprags 14b are being pushed by the outer race 2 in such a direction as to incline, so that the sprags 14b engage neither cylindrical surface 5 or 7. The outer race 2 thus rotates freely.

By using engaging type sprags as in the third embodiment, it is possible to omit the resilient members 16 used in the first embodiment. This makes it possible to assemble the rotary unit with built-in clutch more easily at a lower cost.

Another advantage of omitting the resilient members 16 is that it is possible to reduce the contact surface pressure between the sprags 14b and the inner and outer races 1 and 2 and thus the torque while the clutch is idle. Also, by mounting extra sprags 14b in the space where the elastic members 16 are supposed to be mounted in the arrangement of the first embodiment, it is possible to increase the torque capacity of the entire device.

The omission of the resilient members 16 also makes it possible to totally eliminate malfunctions of the device resulting from the resonance of the resilient members 16.

Instead of the outer race 2, the pulley shown in FIG. 5 or a roller may be used.

The rotary member according to this invention is thus significantly shorter in its axial length than conventional rotary members having their rolling members and sprags arranged axially in series.

Since any radial loads that act on the inner member and outer member are borne by the rolling members, the sprags are practically free of radial loads. Thus, the clutch operates with high precision. Its life is long too.

Since the rolling members and the sprags are held in position by the single common retainer, it is possible to assemble the rotary unit with a smaller number of parts at a lower cost.

In the arrangement in which the engaging type sprags are used, it is possible to omit the resilient members. Such a rotary unit with a clutch function can be assembled more easily at a lower cost.

Both a bearing with a built-in clutch and rotary unit with a built-in clutch according to the present invention are short in their axial length.

By mounting the balls as the rolling members between the inner and outer raceway grooves so that negative radial gaps are formed between the balls and the raceway grooves, it is possible to reduce the inclination of the outer member to a minimum. Thus, if the outer member is a pulley, it can guide the belt stably.

By mounting the balls as the rolling members between the angular-contact type raceway grooves, the outer member is more positively prevented from inclining and also can withstand a higher thrust load.

What is claimed is:

1. An apparatus, comprising:

an inner member having an outer periphery having a first angular-contact raceway groove therein and a pair of first cylindrical surfaces on opposite sides of said first raceway groove;

an outer member disposed around said inner member and having an inner periphery having a second angular-contact raceway groove therein and a pair of second cylindrical surfaces on opposite sides of said second raceway groove;

a plurality of balls disposed between said first and second angular-contact raceway grooves such that each of said plurality of balls has four points of contact with said first and second angular-contact raceway grooves;

a plurality of sprags disposed between adjacent ones of said plurality of balls, each of said plurality of sprags having ends and a length such that said ends rest on said first and second pairs of cylindrical surfaces on opposite sides of said first and second angular-contact raceway grooves, wherein each of said plurality of sprags comprises inner and outer arcuate surfaces;

a retainer disposed between said inner member and said outer member, said retainer comprising pockets housing said plurality of balls, sprag housing recesses housing said plurality of sprags, and an end having openings into said sprag housing recesses; and a spring ring mounted on the one end of said retainer, said spring ring comprising a plurality of spring pieces thereon corresponding in number to said plurality of sprags and extending into respective sprag housing recesses through said openings in said one end of said retainer for resiliently urging said plurality of sprags to engage said cylindrical surfaces of said inner member and said outer member with said inner and outer arcuate surfaces of said plurality of sprags, respectively, said spring pieces comprising integral portions of said spring ring.

2. The apparatus of claim 1, wherein said spring ring comprises an annular portion and said integral portions of said spring ring forming said spring pieces are cantilevered from said annular portion of said spring ring at one end thereof.

3. The apparatus of claim 2, wherein said integral portions are defined by portions that are cut out of said spring ring and raised relative to said spring ring.

4. The apparatus of claim 1, wherein said integral portions are defined by portions that are cut out of said spring ring and raised relative to said spring ring.

5. The apparatus of claim 1, wherein said outer member comprises an outer bearing race.

6. The apparatus of claim 1, wherein said outer member comprises a pulley.

7. The apparatus of claim 1, wherein one said spring ring and said retainer comprises openings and the other of said spring ring and said retainer comprises projections engaging said openings.

8. An apparatus, comprising:

an inner member having an outer periphery having a first angular-contact raceway groove therein and a pair of first cylindrical surfaces on opposite sides of said first raceway groove;

an outer member disposed around said inner member and having an inner periphery having a second angular contact raceway groove therein and a pair of second cylindrical surfaces on opposite sides of said second raceway groove;

a plurality of balls disposed between said first and second angular-contact raceway grooves such that each of said plurality of balls has four points of contact with said first and second angular-contact raceway grooves;

a plurality of centrifugal sprags disposed between adjacent ones of said plurality of balls, each of said plurality of sprags having ends and a length such that said ends rest on said first and second pairs of cylindrical surfaces on opposite sides of said first and second angular-contact raceway grooves, wherein each of said plurality of sprags comprises inner and outer arcuate engagement surfaces; and a retainer disposed between said inner member and said outer member, said retainer comprising pockets housing said plurality of balls, sprag housing recesses housing said plurality of sprags, and an end having openings into said sprag housing recesses.

9. The apparatus of claim 8, wherein said outer member comprises an outer bearing race.

10. The apparatus of claim 8, wherein said outer member comprises a pulley.

* * * * *